US012559967B2

(12) United States Patent
Pownall

(10) Patent No.: US 12,559,967 B2
(45) Date of Patent: Feb. 24, 2026

(54) DOOR HARDWARE MOUNTING SYSTEM AND SPRING ASSIST

(71) Applicant: WSB Hardware, Inc., Branchburg, NJ (US)

(72) Inventor: Kyle J. Pownall, Frewsburg, NY (US)

(73) Assignee: WSB Hardware, Inc., Branchburg, NJ (US)

( * ) Notice: Subject to any disclaimer, the term of this patent is extended or adjusted under 35 U.S.C. 154(b) by 177 days.

(21) Appl. No.: 18/500,329

(22) Filed: Nov. 2, 2023

(65) Prior Publication Data

US 2024/0368917 A1 Nov. 7, 2024

Related U.S. Application Data

(60) Provisional application No. 63/500,360, filed on May 5, 2023.

(51) Int. Cl.
*E05B 3/00* (2006.01)

(52) U.S. Cl.
CPC .................................... *E05B 3/00* (2013.01)

(58) Field of Classification Search
CPC ........................................................ E05B 3/00
See application file for complete search history.

(56) References Cited

U.S. PATENT DOCUMENTS

| | | | | |
|---|---|---|---|---|
| 2,801,869 A * | 8/1957 | George | E05C 5/02 | 70/216 |
| 3,212,806 A * | 10/1965 | Russell | E05B 3/065 | 292/336.3 |
| 3,708,191 A * | 1/1973 | Hegedus | E05B 3/065 | 292/347 |
| 4,998,760 A * | 3/1991 | Nixon | E05B 3/065 | 292/336.3 |
| 5,640,863 A * | 6/1997 | Frolov | E05B 63/0069 | 70/277 |
| 5,718,468 A * | 2/1998 | Qureshi | E05B 63/0056 | 292/357 |
| 6,286,347 B1 * | 9/2001 | Frolov | E05B 47/0692 | 70/277 |
| 6,540,274 B2 * | 4/2003 | Bates | E05C 1/163 | 292/336.5 |
| 6,926,319 B2 * | 8/2005 | Bates | E05C 1/163 | 70/483 |
| 11,078,686 B2 * | 8/2021 | Barker | E05B 15/0033 | |
| 11,377,872 B2 * | 7/2022 | Barker | E05C 1/163 | |
| 11,585,116 B2 * | 2/2023 | Riley | E05B 3/065 | |
| 2007/0176435 A1 * | 8/2007 | Zimmer | E05B 3/065 | 292/336.3 |

* cited by examiner

*Primary Examiner* — Mark A Williams
(74) *Attorney, Agent, or Firm* — Husch Blackwell LLP

(57) ABSTRACT

A door hardware mounting system & spring assist is provided. The door hardware mounting system & spring assist includes a housing attachable to a knob or a lever, the housing having a cavity therein; a rotational actuator provided within the cavity, the rotational actuator having a first actuator tab and a second actuator tab; and a first spring and a second spring provided within the cavity, wherein the first actuator tab abuts the first spring and the second actuator tab abuts the second spring.

21 Claims, 18 Drawing Sheets

DOOR HARDWARE MOUNTING SYSTEM AND SPRING ASSIST

CROSS-REFERENCE TO RELATED APPLICATION

This application claims the benefit of the filing date of U.S. Provisional Application Ser. No. 62/500,360 filed May 5, 2023, entitled “Door Knob Spring”, which is hereby incorporated by reference as if fully set forth herein.

TECHNICAL FIELD

This disclosure generally relates to a door hardware mounting system & spring assist. More specifically, this disclosure pertains to using springs bent around a rotational actuator to assist with the opening mechanism of a doorknob system when a door handle, lever, or knob is rotated. Further, this disclosure also relates to using a hard stop position to prevent over-rotation of a doorknob system by creating angled actuator tabs and using the edges of the housing.

BACKGROUND

Springs have been used in the door hardware industry for many years. However, most designs utilize a torsional spring and a type of retainer encased in a housing. For example, a torsional spring and a spring retainer may be used to apply force to an independent post, creating the torsional energy required to support a door lever in a resting horizontal position.

Other doorknob systems may include a torsional spring enclosed in a housing with an actuator and an integrated hub, where the torsional spring may be wrapped around the actuator and applies a load to the integrated hub.

Most of existing doorknob systems have a cutout or notches in the actuator which straddles the post and creates a positive stop needed to support the door hardware horizontally and the angular rotational limit of the spring assist.

In a bidirectional, or knob-style doorknob system, the independent posts act as the centering mechanism for a singular torsional spring. The spring is preloaded to “pinch” the post, and a retainer with one or more teeth traps the spring and connects it to the rotational hub. As the hub is rotated in either direction, the retainer tooth that was placed between the spring legs pushes against one leg creating the torsional energy required to return the door hardware after retraction.

In yet another linear spring-type doorknob system, two stamped steel actuators may encase a cam-like mechanism that allows the doorknob/lever to operate in two directions instead of one. This type of system may not contain a positive stop for maintaining a horizontal lever position. Rather, each actuator may push on one end of the same spring depending on the direction of rotation. Further, the spring in this type of system works in a linear direction and may be assembled and integrated into other larger hardware systems in different ways.

Other doorknob systems may contain a single custom-made spring that straddles a latch body and a door spindle to create additional torque on the spindle in order to assist in returning the doorknob/lever to the horizontal position.

Despite the various doorknob systems currently on the market, there is a continuous need for more compact and self-contained doorknob system designs.

BRIEF SUMMARY

A first aspect of this disclosure pertains to a door hardware spring assist including a first housing attachable to a knob or a lever; the first housing having a first cavity therein; a first rotational actuator provided within the first cavity, the first rotational actuator having a first actuator tab and a second actuator tab; and a first spring and a second spring provided within the first cavity, wherein the first actuator tab abuts the first spring and the second actuator tab abuts the second spring.

A second aspect of this disclosure pertains to the door hardware spring assist of the first aspect, wherein the first actuator tab is provided on a first side of the first rotational actuator and the second actuator tab is provided on a second side of the first rotational actuator opposite the first side.

A third aspect of this disclosure pertains to the door hardware spring assist of the first aspect, wherein the first actuator tab abuts the first spring from a first direction and the second actuator tab abuts the second spring from a second direction.

A fourth aspect of this disclosure pertains to the door hardware spring assist of the third aspect, wherein the first actuator tab abuts the first spring from above and the second actuator tab abuts the second spring from below, such that the first spring and the second spring jointly provide resistance force against the first rotational actuator when the first rotational actuator is rotated in a counterclockwise direction by an external force.

A fifth aspect of this disclosure pertains to the door hardware spring assist of the third aspect, wherein the first actuator tab abuts the first spring from below and the second actuator tab abuts the second spring from above, such that the first spring and the second spring jointly provide resistance force against the first rotational actuator when the first rotational actuator is rotated in a clockwise direction by an external force.

A sixth aspect of this disclosure pertains to the door hardware spring assist of the first aspect, wherein the first actuator tab abuts the first spring and the second actuator tab abuts the second spring from a same direction, such that the first spring or the second spring provides resistance force against the first rotational actuator when the first rotational actuator is rotated in either a clockwise direction or a counterclockwise direction by an external force.

A seventh aspect of this disclosure pertains to the door hardware spring assist of the sixth aspect, wherein the first actuator tab abuts the first spring from above and the second actuator tab also abuts the second spring from above.

An eighth aspect of this disclosure pertains to the door hardware spring assist of the first aspect, wherein a first end of the first spring abuts the first actuator tab and a second end of the first spring abuts the first housing, and a first end of the second spring abuts the second actuator tab and a second end of the second spring abuts the first housing.

A ninth aspect of this disclosure pertains to the door hardware spring assist of the first aspect, wherein the first actuator tab having a first side and a second side opposite the first side, and the second actuator tab having a first side and a second side opposite the first side, wherein the first side of the first actuator tab abuts the first spring and the first side of the second actuator tab abuts the second spring, and while the first rotational actuator is in a neutral position, the second side of the first actuator tab abuts the first housing and the second side of the second actuator tab also abuts the first housing.

A tenth aspect of this disclosure pertains to the door hardware spring assist of the first aspect, wherein the first housing further includes a notch for receiving a stud or a fastener therein.

An eleventh aspect of this disclosure pertains to a door hardware spring assist of the first aspect, wherein the first housing further includes a fastening bore for receiving a fastener therein.

A twelfth aspect of this disclosure pertains to the door hardware spring assist of the first aspect, wherein the first spring and the second spring are provided on different sides of the first housing.

A thirteenth aspect of this disclosure pertains to the door hardware spring assist of the first aspect further includes a first mounting plate coupled to the first housing such that the first rotational actuator, the first spring, and the second spring are encased between the first mounting plate and the first housing.

A fourteenth aspect of this disclosure pertains to the door hardware mounting system & spring assist of the thirteenth aspect further includes a second housing attachable to the knob or the lever; the second housing having a second cavity therein; a second rotational actuator provided within the second cavity, the second rotational actuator having a third actuator tab and a fourth actuator tab; a third spring and a fourth spring provided within the second cavity, wherein the third actuator tab abuts the third spring and the fourth actuator tab abuts the fourth spring; and a second mounting plate coupled to the second housing such that the second rotational actuator, the third spring, and the fourth spring are encased between the second mounting plate and the second housing.

A fifteenth aspect of this disclosure pertains to the door hardware mounting system & spring assist of the fourteenth aspect further includes a latch stabilizer provided between the first housing and the second housing.

A sixteenth aspect of this disclosure pertains to the door hardware mounting system & spring assist of the first aspect, wherein the first rotational actuator further includes a boss protruding from a first surface of the first rotational actuator, wherein the first housing further includes a housing bore for receiving the boss, and wherein the boss together with the housing bore are configured to keep the first rotational actuator concentric with the first housing.

A seventeenth aspect of this disclosure pertains to a door hardware mounting system & spring assist including a first housing attachable to a knob or a lever; the first housing having a first cavity therein; a first rotational actuator provided within the first cavity, the first rotational actuator having a first actuator tab and a second actuator tab; a first spring and a second spring provided within the first cavity, wherein the first actuator tab abuts the first spring and the second actuator tab abuts the second spring; a first mounting plate coupled to the first housing such that the first rotational actuator, the first spring, and the second spring are encased between the first mounting plate and the first housing; a second housing attachable to the knob or the lever; the second housing having a second cavity therein; a second rotational actuator provided within the second cavity, the second rotational actuator having a third actuator tab and a fourth actuator tab; a third spring and a fourth spring provided within the second cavity, wherein the third actuator tab abuts the third spring and the fourth actuator tab abuts the fourth spring; a second mounting plate coupled to the second housing such that the second rotational actuator, the third spring, and the fourth spring are encased between the second mounting plate and the second housing; and a latch stabilizer provided between the first housing and the second housing.

An eighteenth aspect of this disclosure pertains to the door hardware mounting system & spring assist of the seventeenth aspect, wherein the first actuator tab abuts the first spring and the third actuator tab abuts the third spring from above respectively, and the second actuator tab abuts the second spring and the fourth actuator tab abuts the fourth spring from below respectively, such that the first spring, the second spring, the third spring, and the fourth spring jointly provide resistance force against the first rotational actuator and the second rotational actuator respectively when the first rotational actuator and the second rotational actuator are rotated in a counterclockwise direction by an external force.

A nineteenth aspect of this disclosure pertains to the door hardware mounting system & spring assist of the seventeenth aspect, wherein the first actuator tab abuts the first spring and the third actuator tab abuts the third spring from below respectively, and the second actuator tab abuts the second spring and the fourth actuator tab abuts the fourth spring from above respectively, such that the first spring, the second spring, the third spring, and the fourth spring jointly provide resistance force against the first rotational actuator and the second rotational actuator respectively when the first rotational actuator and the second rotational actuator are rotated in a counterclockwise direction by an external force.

A twentieth aspect of this disclosure pertains to the door hardware mounting system & spring assist of the seventeenth aspect, wherein the first actuator tab abuts the first spring, the second actuator tab abuts the second spring, the third actuator tab abuts the third spring, and the fourth actuator tab abuts the fourth spring each from a same direction, such that the first spring with the third spring or the second spring with the fourth spring provide resistance force against the first rotational actuator and the second rotational actuator respectively when the first rotational actuator and the second rotational actuator are rotated in either a clockwise direction or a counterclockwise direction by an external force.

Figure 1A:
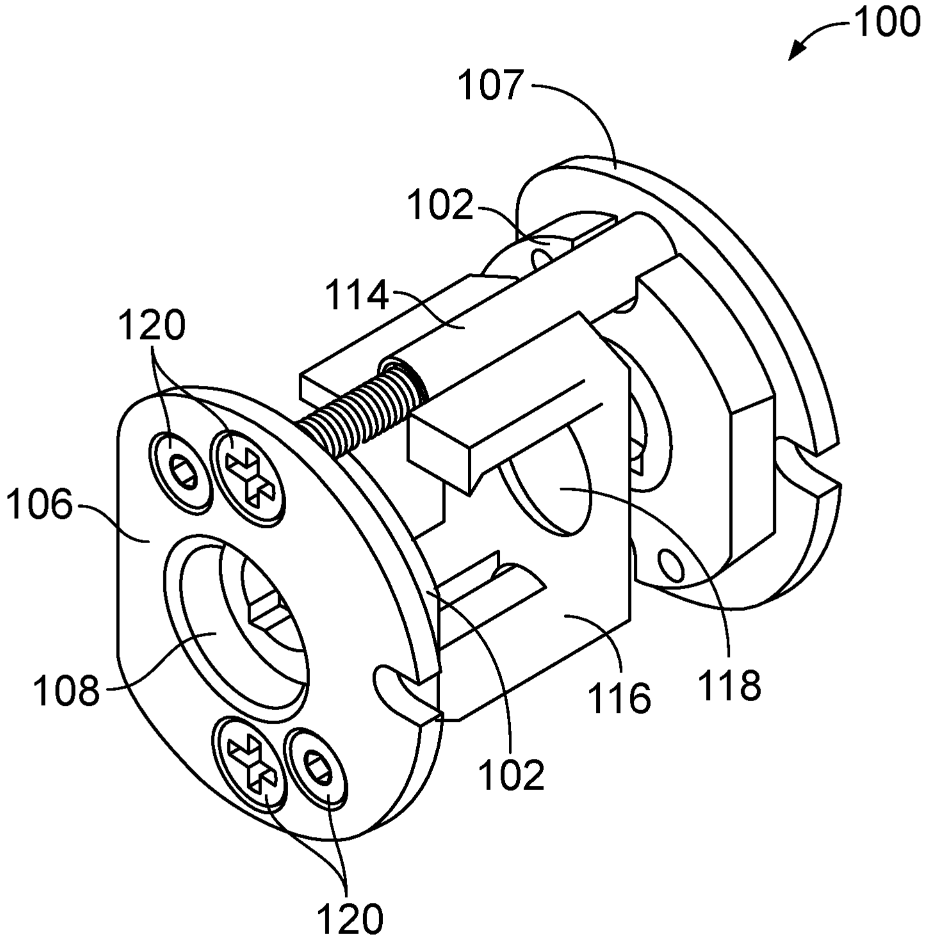
FIG. 1A illustrates a partial view of a unidirectional doorknob system according to an embodiment.

Before explaining the disclosed embodiment of this disclosure in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible to embodiments that take many different forms, and although the drawings show specific embodiments described in detail below, it will be understood that the present disclosure is an example of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

FIGS. 1A-6C illustrate a door hardware mounting system and spring assist system according to various embodiments. Referring to FIGS. 1A-1D, a spring assist doorknob system 100, 100' according to some embodiments is illustrated. The system 100 may be unidirectional that may be suitable for use with a lever (see FIGS. 1A-1B) or the system 100' may be bidirectional that may be suitable for use with a doorknob (see FIGS. 1C-1D). The system 100 may be meant for an example bore diameter of 1⅜", while the system 100' may be meant for an example bore diameter of 2⅛". The systems 100 and 100' will be referred to hereinafter as system 100 for ease of reference, unless otherwise noted, with the "prime" designation being used for other slightly different components in each.

The system 100 may include a first mounting plate 106 provided on a first side of the system 100 and a second mounting plate 107 provided on a second side of the system 100 opposite the first side.

The first mounting plate 106 and the second mounting plate 107 may be structurally similar, each including a mounting plate bore 108 and one or more fastening bores 120 for receiving fasteners therethrough. Fasteners compatible with the system 100 may include, but are not limited to, a #8-32×1 Phillips head stainless steel screw, a #6-32×¼" FHMS Torx stainless steel screw, a #8-32×⅜" UCFHMS Torx stainless steel screw, #6-32×3⁄16" SHCS stainless steel hex drive with TR Patch screw (either alone or with a #6 socket head locking washer stainless steel), or any combination thereof.

The system 100 may further include a mounting stud 114 and a latch stabilizer 116, 116', each provided in between the first mounting plate 106 and the second mounting plate 107. The latch stabilizer 116, 116' may further include a latch stabilizer bore 118, 118'.

One or more housings 102 may be provided between the first mounting plate 106 and the second mounting plate 107. In the illustrated example, a first housing 102 may be provided proximal to the first mounting plate 106, and a second housing 102 may be provided proximal to the second mounting plate 107. The housings 102 may be coupled to the mounting plates 106 or 107, and the actuator 104 is coupled to the door lever or knob via a spindle (also not shown)

Each of the housing 102 may enclose a spring and actuator system therein. Referring to FIG. 1B specifically, each of the housing 102 may enclose one or more springs 110, 111. Each of the springs 110, 111 may be a linear spring such as a compression spring or a helical spring. However, in other embodiments, each of the springs 110, 111 may be an extension spring, a conical spring, a torsion spring, a spiral spring, a leaf spring, a disk spring, or other suitable springs.

Moreover, a rotational actuator 104 may be provided within each of the housing 102. The rotational actuator 104 may include a plurality of actuator tab 112, 113, each corresponding to one of the springs 110, 111 such that one of the plurality of actuator tab 112, 113 abuts one of the springs 110, 111. During assembly, the springs 110, 111 may each be partially or wholly compressed to create a preloaded force to support the lever or the doorknob in a resting position.

Figure 1B:
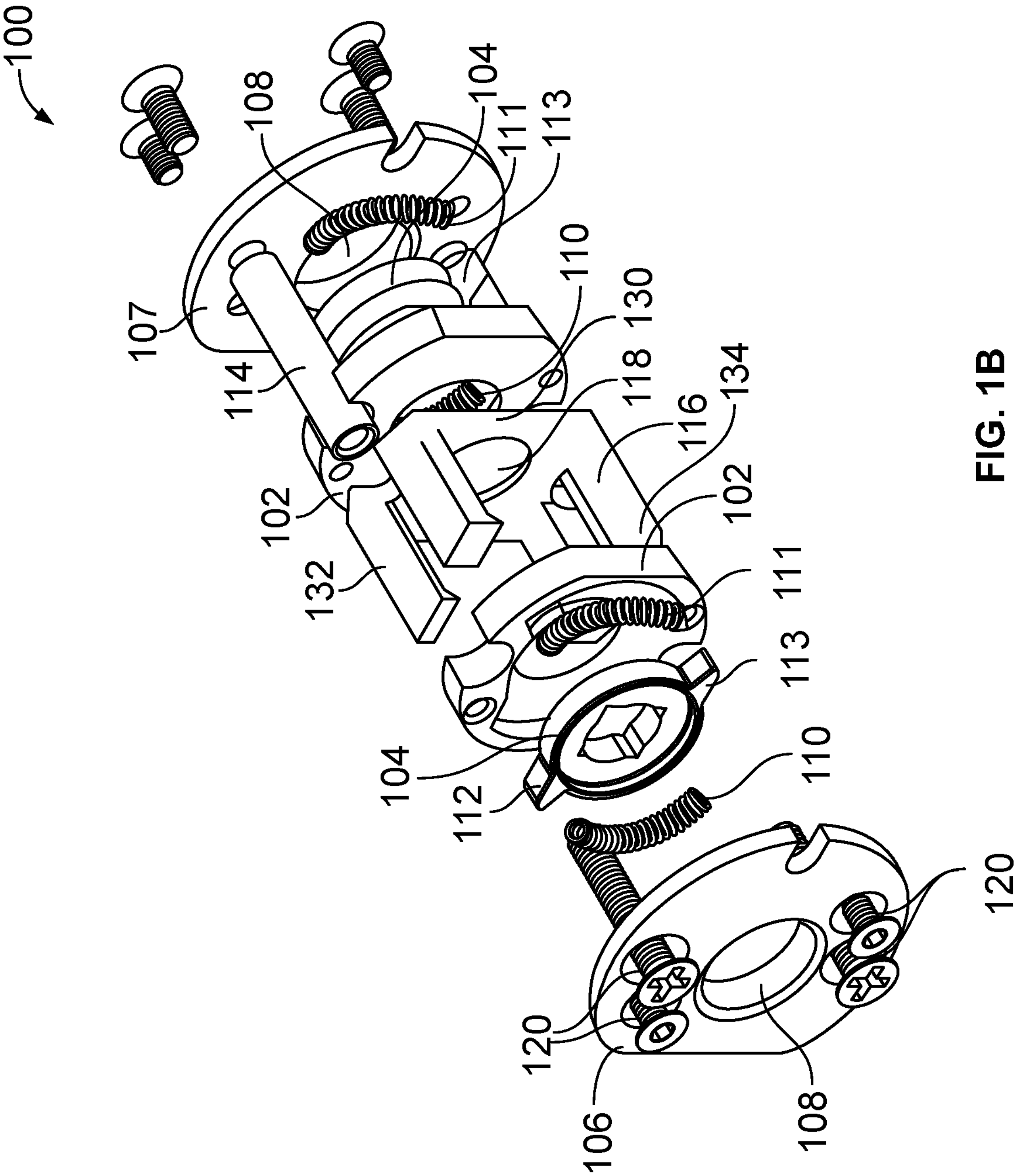
FIG. 1B illustrates an exploded view of the unidirectional doorknob system of FIG. 1A.
Figure 1C:
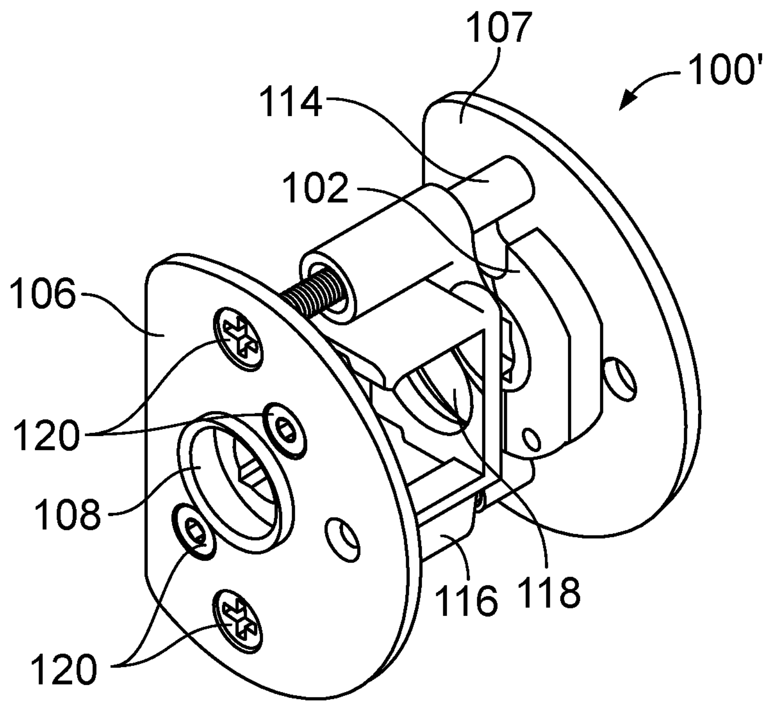
FIG. 1C illustrates a partial view of a bidirectional doorknob system according to an embodiment.
Figure 1D:
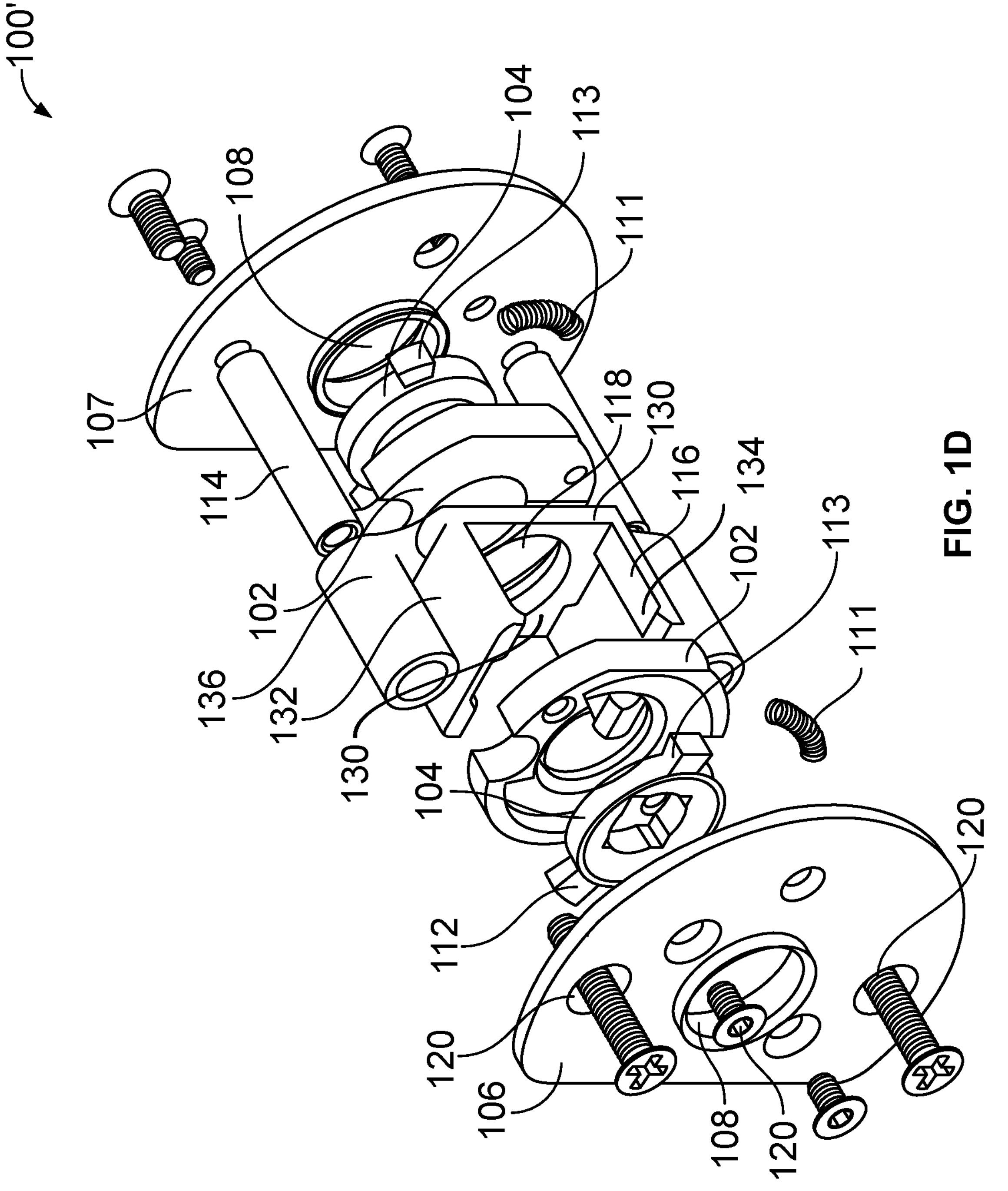
FIG. 1D illustrates an exploded view of the bidirectional doorknob system of FIG. 1C.

A difference between the embodiment illustrated in FIGS. 1A and 1B versus the embodiment illustrated in FIGS. 1C and 1D is the placement of the springs 110, 111. Referring to FIG. 1B, in a unidirectional configuration, a first spring 110 may be provided below the rotational actuator 104 and a second spring 111 may be provided above the rotational actuator 104. Two actuator tabs may be provided in such a configuration, where a first actuator tab 112 abuts the first spring 110 from above and a second actuator tab 113 abuts the second spring 111 from below.

By placing the first spring 110 and the second spring 111 in opposite directions relative to the rotational actuator 104, the first spring 110 and the second spring 111 jointly serve to ensure that when a lever-style handle connected to the system 100 is turned (i.e., rotating the rotational actuator 104 with an external force), the first spring 110 and the second spring 111 are both compressed in the same direction of rotation (such as clockwise or counterclockwise), thus ensuring that the system 100 is balanced and mechanically stabled.

The first spring 110 and the second spring 111 may each be designed to meet a criteria of strength and maximum allowed angular rotation required for the complete retraction of the door lever latch. In the unidirectional configuration illustrated in FIGS. 1A and 1B, the backside of the actuator tab 112, 113 may each be angled relative to a centerline broach in such a way that when the actuator tab 112, 113 meets the opposing housing edge after being preloaded by the springs, the actuator tab 112, 113 creates a starting angle to maintain a horizontal resting position for the lever.

Referring to FIGS. 1C and 1D, in a bidirectional configuration, each of the springs 110, 111 may be slightly compressed to create a preload force to support the knob-style handle in a neutral resting position. Unlike the unidirectional configuration however, in the bidirectional configuration, both the first spring 110 and the second spring 111 may be provided below the rotational actuator 104. Again, two actuator tabs may be provided in such a configuration, where the first actuator tab 112 abuts the first spring 110 from above and a second actuator tab 113 also abuts the second spring 111 from above. As can be appreciated however, in further embodiments, both the first spring 110 and the second spring 111 can be provided above the rotational actuator 104 instead of below; these and other variations are also contemplated and are within the scope of this disclosure.

By placing the first spring 110 and the second spring 111 in the same direction (both below or both above) relative to the rotational actuator 104, the first spring 11 and the second spring 111 may be slightly compressed, creating a pre-load force applied on a same side of the rotational actuator 104, which causes the first spring 110 and the second spring 111 to work against each other. Thus, the first actuator tab 112 and the second actuator tab 113 may exert opposing forces, resulting in the system 100 being mechanically stable and allowing the actuator 104 to maintain a neutral resting position between the first spring 110 and the second spring 111.

When a knob-style handle coupled to the bidirectional configuration is rotated in either direction, either the first spring 110 or the second spring 111 may be compressed, while the other spring may be extended. When the knob-style handle is released, the previously compressed spring may push the actuator 104 and the knob-style handle connected therein towards a center location until the force is balanced by compressing the opposing spring equally to maintain the neutral resting position.

The first spring 110 and the second spring 111 may each be selected based on design criteria of strength and maximum allowed angular rotation which is required for the complete retraction of the latch. In the bidirectional configuration illustrated in FIGS. 1C and 1D, The backside of each actuator tab 112, 113 may each be angled in such a way that as the knob-style handle is rotated in either direction, the respective actuator tab may stop the system from rotating beyond a compressive limit of the first spring 110 or the second spring 111.

The mounting stud 114 of the system 100 may be a cylindrical shape with a hollowed-out core. The mounting stud 114 may have a length of about 1⅛ inches with an outer diameter of about 6 mm and an inner diameter of about 0.1360 inches and a tap size of #8-32 creating a threaded hollowed-out core.

The latch stabilizer 116 may include a base wall 130 with a top wall 132 and a bottom wall 134 protruding from the base wall 130. The top wall 132 and the bottom wall 134 may each be generally perpendicular to the base wall 130. In some embodiments, the top wall 132 and the bottom wall 134 may each be partially circular in shape. The top wall 132 and the bottom wall 134 may each include a curved portion between two flat edge portions. The curved portion of the top wall 132 and the bottom wall 134 may each be convex or concave.

The top wall 132 and the bottom wall 134 may each further include a cutout portion such that the mounting stud 114 may be received therein. The cutout portion may be in a shape of a channel.

In some embodiments, the latch stabilizer 116 may further include a stud receiving portion 136 for receiving the mounting stud 114 therethrough. A first stud receiving portion 136 may be provided adjacent to the top wall 132 and a second stud receiving portion 136 may be provided adjacent to the bottom wall 134. Each of the stud receiving portion 136 may be cylindrical in shape, with an inner diameter larger than an outer diameter of the mounting stud 114, such that the mounting stuff 114 can be received therethrough.

The base wall 130 may further include the latch stabilizer bore 118 therethrough. The latch stabilizer bore 118 may be provided proximal to a center of the base wall 130. The counterbore may be circular in shape. In some embodiments, the counterbore may be about 1⅜ inch in size.

The top wall 132 and/or the bottom wall 134 of the latch stabilizer 116 may be extruded from the base wall 130. The top wall 132 and/or the bottom wall 134 may each have a length of about 20 mm.

In some embodiments, the latch stabilizer 116 may be an oblong shape with a flat-plated backside, a flat edge on two sides, two holes where one is located on the top end and another located on the bottom, concave curved edges that meet with the corner of the flat edge and a rounded outer edge of the holes at the opposite upper and lower ends, and a centrally located 2-⅛ inch circular counterbore on the face of the flat-plated backside.

In such embodiments, the latch stabilizer 116 may have a portion that is extruded from the flat-plated backside, beginning near the corner where the flat edge meets the concave curved edge and across from one of the flat edges to the other flat ends, and with a width of about 1⁄16 inch, and another extruded portion that is cylindrical in shape with a hollowed-out core surrounding the hole on the upper end and surrounding the hole on the lower end, with an inner diameter of ¼ inch and an outer radius of about 3⁄16 inch. In this embodiment, the extruded portions may be a length of about 20 mm. The cylindrical shape with a hollowed-out core extruded from the flat-plated backside may receive the mounting fasteners.

Figure 2A:
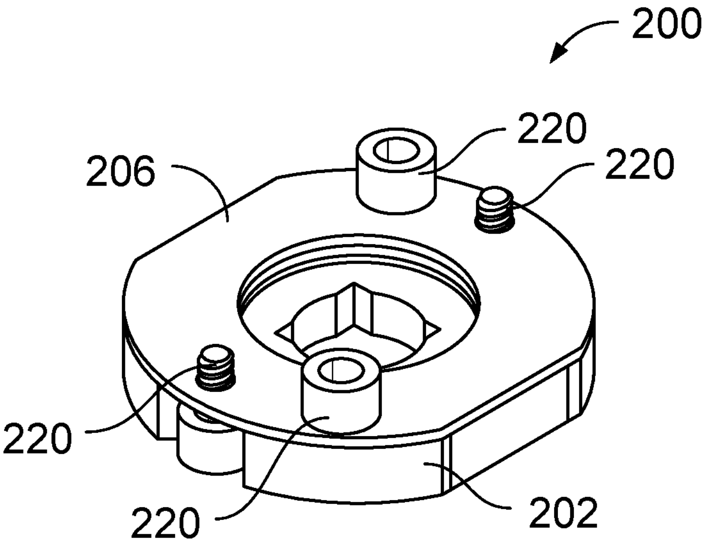
FIG. 2A illustrates an isometric view of a lefthanded doorknob system according to an embodiment.
Figure 2B:
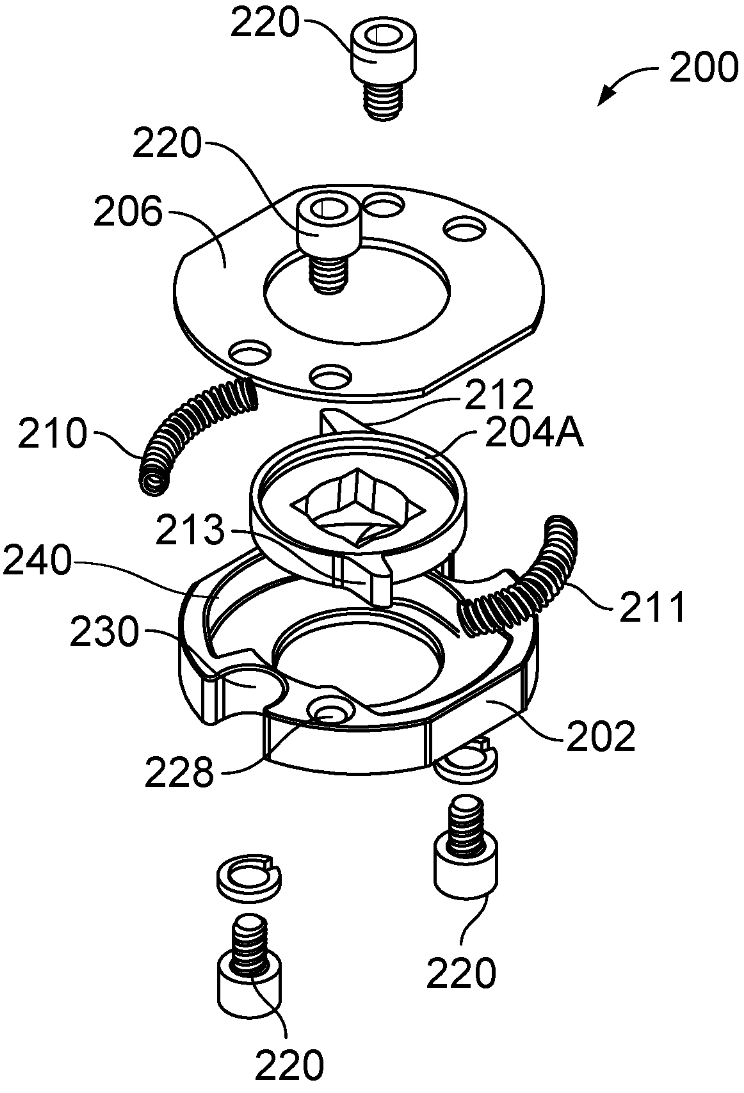
FIG. 2B illustrates an exploded view of the lefthanded doorknob system of FIG. 2A.
Figure 2C:
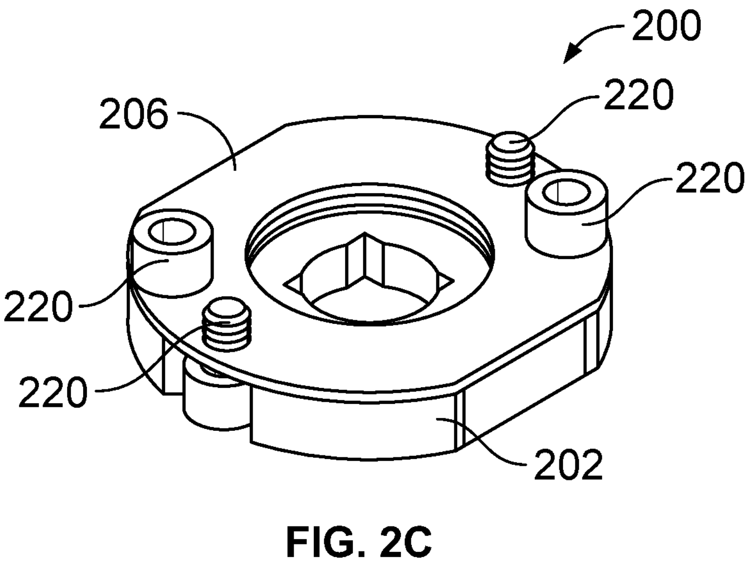
FIG. 2C illustrates an isometric view of a righthanded doorknob system according to an embodiment.
Figure 2D:
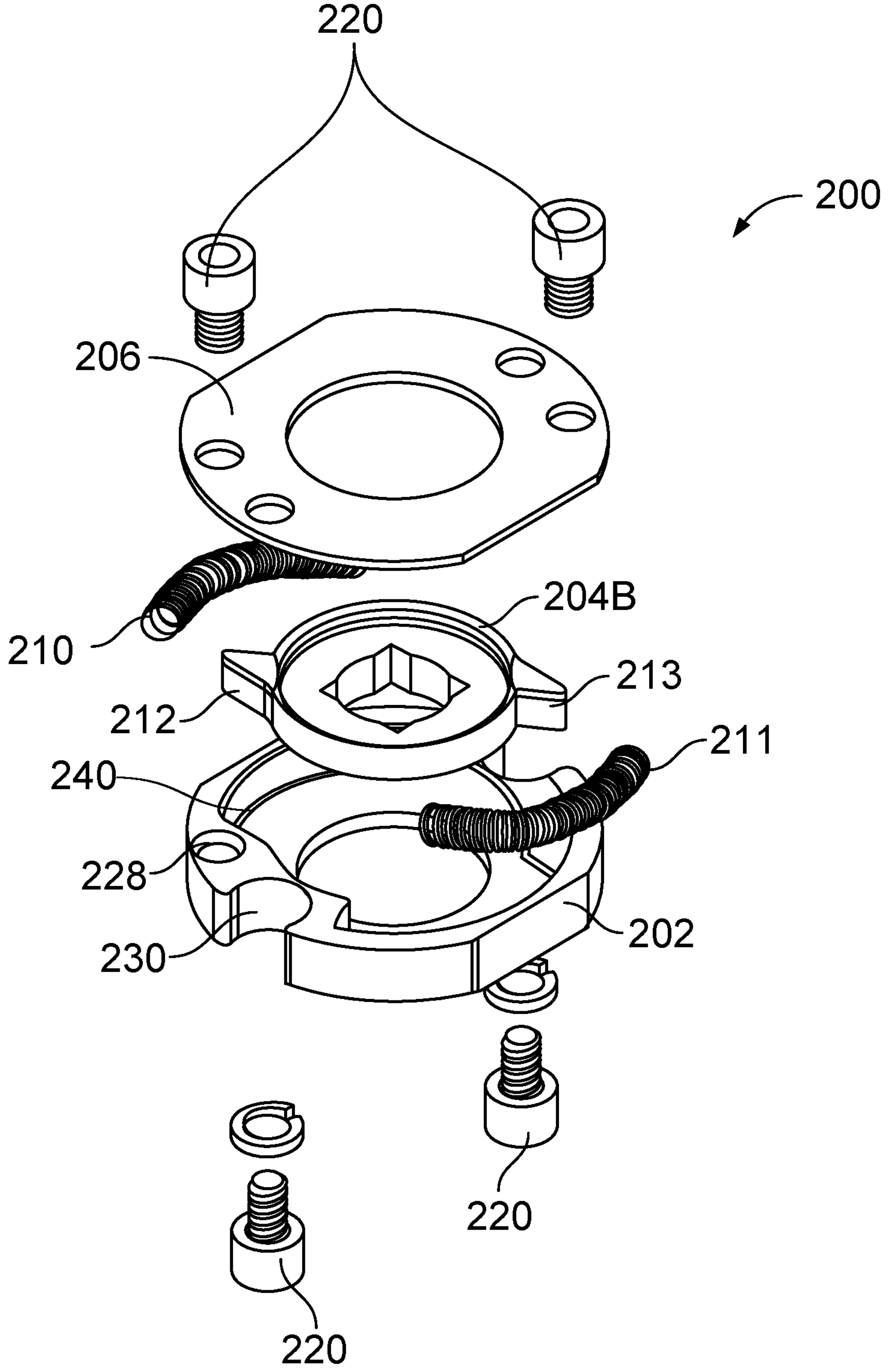
FIG. 2D illustrates an exploded view of the righthanded doorknob system of FIG. 2D.

FIGS. 2A-2D illustrate additional embodiments of unidirectional doorknob system 200. Specifically, FIGS. 2A and 2B illustrate the system 200 being configured for lefthanded use, and FIGS. 2C and 2D illustrate the system 200 being configured for righthanded use. The system 200 of FIGS. 2A-2D are used for escutcheons of either 1⅜" or 2⅛" bore and either unidirectional or bi-directional, depending on springs and actuators.

The system 200 may include a mounting plate 206 coupled to a housing 202 through one or more fasteners 220. The mounting plate 206 may include one or more fastening holes each corresponding to a fastening bore on the housing 202 for receiving a fastener 220 therein. In addition, the housing 202 may include one or more notches 230 that may correspond to a shape of the fasteners 220 (such as a shape of a base portion of the fastener), such that one of the fasteners 220 can be provided in one of the notches 230 to be fastened to the mounting plate 206.

Referring to FIGS. 2B and 2D, the housing 202 may contain a rotational actuator 204A, 204B therein and one or more springs 210, 211. Each of the springs 210, 211 may be a linear spring such as a compression spring or a helical spring. However, in other embodiments, each of the springs 210, 211 may be an extension spring, a conical spring, a torsion spring, a spiral spring, a leaf spring, a disk spring, or other suitable springs.

A primary difference between the rotational actuator 204A shown in FIG. 2B and the rotational actuator 204B shown in FIG. 2D is the placement of actuator tabs 212, 213 relatives to the placements of the springs 210, 211.

Specifically, in the configuration illustrated in FIG. 2B, a flat portion of a first actuator tab 212 may be provided above a first spring 210 and a flat portion of a second actuator tab 213 may be provided below a second spring 211, such that when the rotational actuator 204A is rotated in a counterclockwise direction, both the first spring 210 and the second spring 211 become compressed by their respective actuator tab 212 and 213. When a door lever attached to the rotational actuator 204A is released, the rotational actuator 204A would then naturally rotate in a clockwise direction until the actuator tabs 212, 213 abut against the housing 202 and/or until the springs 210, 211 are no longer compressed. As such, the system 200 shown in FIG. 2B provides resistance when an attached lever is rotated counterclockwise, making this embodiment especially suitable for lefthanded applications.

In contrast, in the configuration illustrated in FIG. 2D, a flat portion of a first actuator tab 212 may be provided below a first spring 210 and a flat portion of a second actuator tab 213 may be provided above a second spring 211, such that when the rotational actuator 204B is rotated in a clockwise direction, both the first spring 210 and the second spring 211 become compressed by their respective actuator tab 212 and 213. When a door lever attached to the rotational actuator 204B is released, the rotational actuator 204B would then naturally rotate in a counterclockwise direction until the actuator tabs 212, 213 abut against the housing 202 and/or until the springs 210, 211 are no longer compressed. As such, the system 200 shown in FIG. 2D provides resistance when an attached lever is rotated clockwise, making this embodiment especially suitable for righthanded applications.

In either embodiments shown in FIG. 2B or 2D, the rotational actuator 204A, 204B and the springs 210, 211 may be nested within a cavity 240 of the housing 202. The springs 210, 211 may be bent within the cavity 240. The springs 210, 211 may work together in a same direction of rotation to create a balanced, stable mechanical system.

Figure 3A:
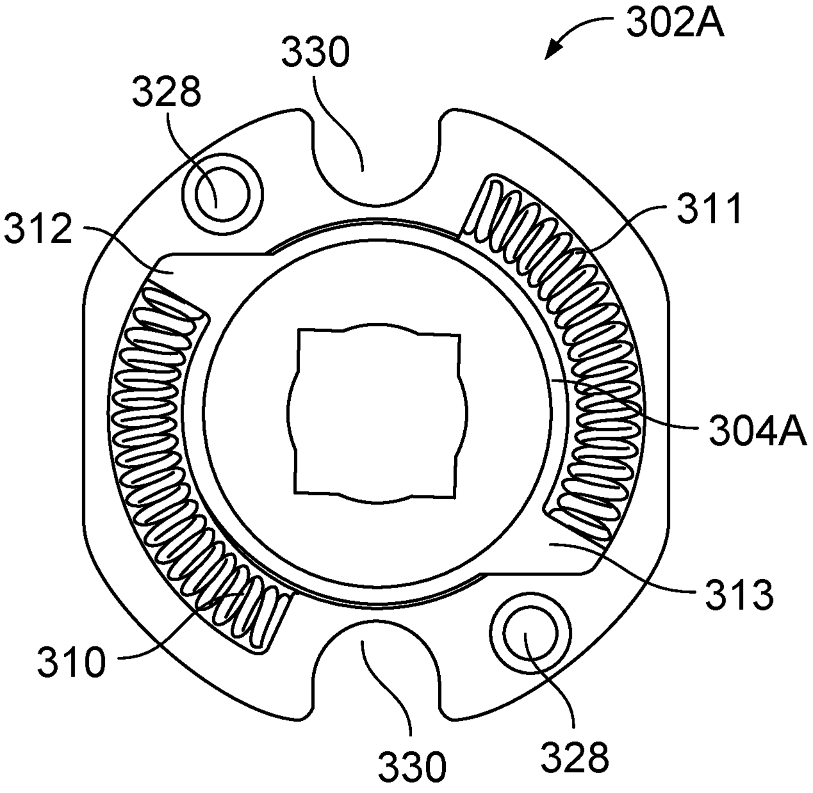
FIG. 3A illustrates a detailed view of a lefthanded doorknob housing according to an embodiment.
Figure 3B:
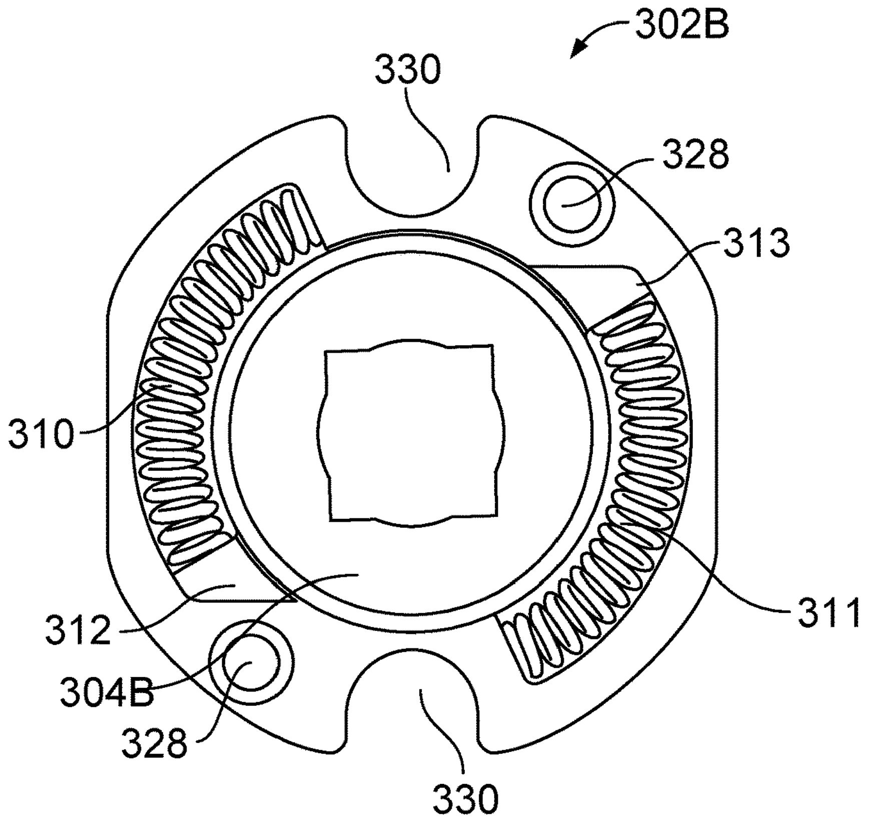
FIG. 3B illustrates a detailed view of a righthanded doorknob housing according to an embodiment.
Figure 3C:
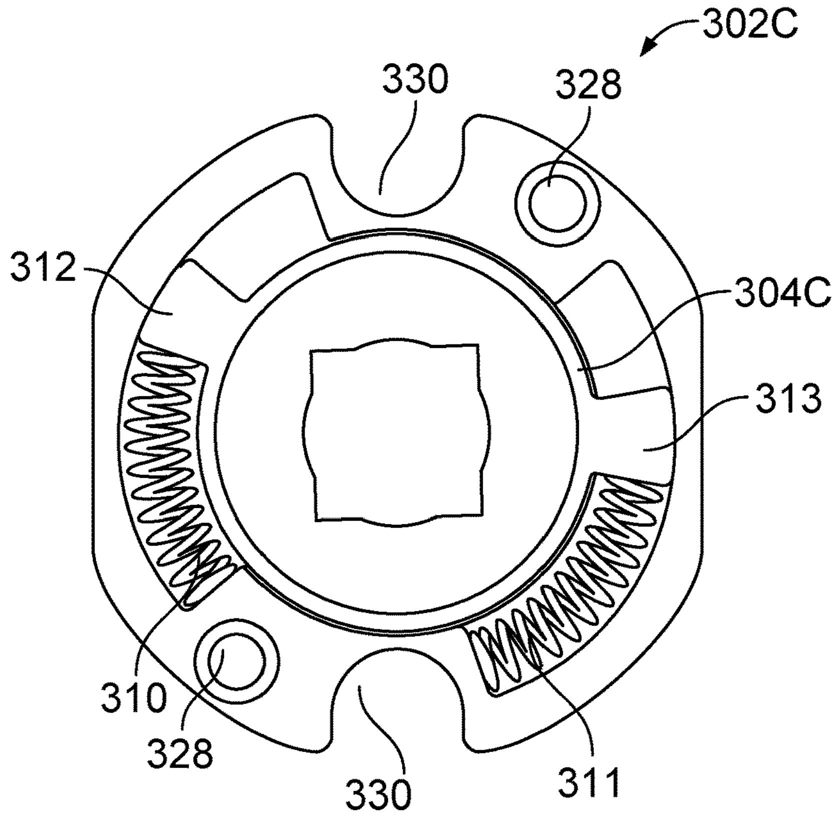
FIG. 3C illustrates a detailed view of a bidirectional doorknob housing according to an embodiment.

FIGS. 3A-3C illustrate detailed views of a housing 302A, 302B, 302C relative to a rotational actuator 304A, 304B, 304C. Specifically, FIG. 3A illustrates a lefthanded unidirectional configuration; FIG. 3B illustrates a righthanded unidirectional configuration; and FIG. 3C illustrates a bidirectional configuration.

Referring to FIGS. 3A and 3B, in unidirectional configurations, the housing 302A, 302B may each enclose the rotational actuator 304A, 304B and one or more springs 310, 311. Each of the springs 310, 311 may be a linear spring such as a compression spring or a helical spring. However, in other embodiments, each of the springs 310, 311 may be an extension spring, a conical spring, a torsion spring, a spiral spring, a leaf spring, a disk spring, or other suitable springs.

A primary difference between the two embodiments is the placement of actuator tabs 312, 313 relatives to the placements of the springs 310, 311. Specifically, in the configuration illustrated in FIG. 3A, a flat portion of a first actuator tab 312 may be provided above a first spring 310 and a flat portion of a second actuator tab 313 may be provided below a second spring 311, such that when the rotational actuator 304A is rotated in a counterclockwise direction, both the first spring 310 and the second spring 311 become compressed by their respective actuator tab 312 and 313. When a door lever attached to the rotational actuator 304A is released, the rotational actuator 304A would then naturally rotate in a clockwise direction until the actuator tabs 312, 313 abut against the housing 302A and/or until the springs 310, 311 are no longer compressed. In the illustrated embodiment in FIG. 3A, the actuator tab 312, 313 may each include a slanted portion opposite the flat portion such that the slanted portion abuts the housing 302A when the door lever attached to the rotational actuator 304A is released. As such, the configuration shown in FIG. 3A provides resistance when an attached lever is rotated counterclockwise, making this embodiment especially suitable for lefthanded applications In contrast, in the configuration illustrated in FIG. 3B, a flat portion of a first actuator tab 312 may be provided below a first spring 310 and a flat portion of a second actuator tab 313 may be provided above a second spring 311, such that when the rotational actuator 304B is rotated in a clockwise direction, both the first spring 310 and the second spring 311 become compressed by their respective actuator tab 312 and 313. When a door lever attached to the rotational actuator 304B is released, the rotational actuator 304B would then naturally rotate in a counterclockwise direction until the actuator tabs 312, 313 abut against the housing 302B and/or until the springs 310, 311 are no longer compressed. As such, the configuration shown in FIG. 3B provides resistance when an attached lever is rotated clockwise, making this embodiment especially suitable for righthanded applications.

Referring to FIG. 3C, in the bidirectional, the housing 302C may enclose the rotational actuator 304C and one or more springs 310, 311. Again, each of the springs 310, 311 may be a linear spring such as a compression spring or a helical spring. However, in other embodiments, each of the springs 310, 311 may be an extension spring, a conical spring, a torsion spring, a spiral spring, a leaf spring, a disk spring, or other suitable springs.

In the bidirectional embodiment illustrated in FIG. 3C, a first side of a first actuator tab 312 may be provide above a first spring 310, and a first side of a second actuator tab 313 may also be provided above a second spring 311, such that when a doorknob is attached to the rotational actuator 304C, resistance may be provided in both clockwise and counterclockwise direction. When the doorknob is released, the first spring 310 and the second spring 311 may each act to return the rotational actuator 304C to a neutral position.

In other embodiments, the first actuator tab 312 may be provided below the first spring 310 and the second actuator tab 313 may be provided below the second spring 311 to achieve a similar functionality.

A second side of the first actuator tab 312 and a second side of the second actuator tab 313 may each include a shape (such as a flat or a slanted surface) such that the second side of the first actuator tab 312 or the second side of the second actuator tab 313 can abut against the housing 302C to prevent over-rotation be the attached doorknob.

The housing 302A, 302B, 302C may each be a stadium shape (such as having two flat sides and two semi-circular top and bottom portions). However, other shapes are also possible and contemplated herein.

One or more notches 330 may be provided on the housing 302A, 302B, 302C. The notches 330 may be shaped to fit the placement of a mounting stud, which may be used to secure the system together via fasteners received in a mounting stud. One or more fastening holes or bores 328 may also be provided to receive a fastener therein. In some embodiments, the fastening holes 328 and the notches 330 may each be provided on opposite sides or ends of the housing 302A, 302B, 302C.

Figure 4A:
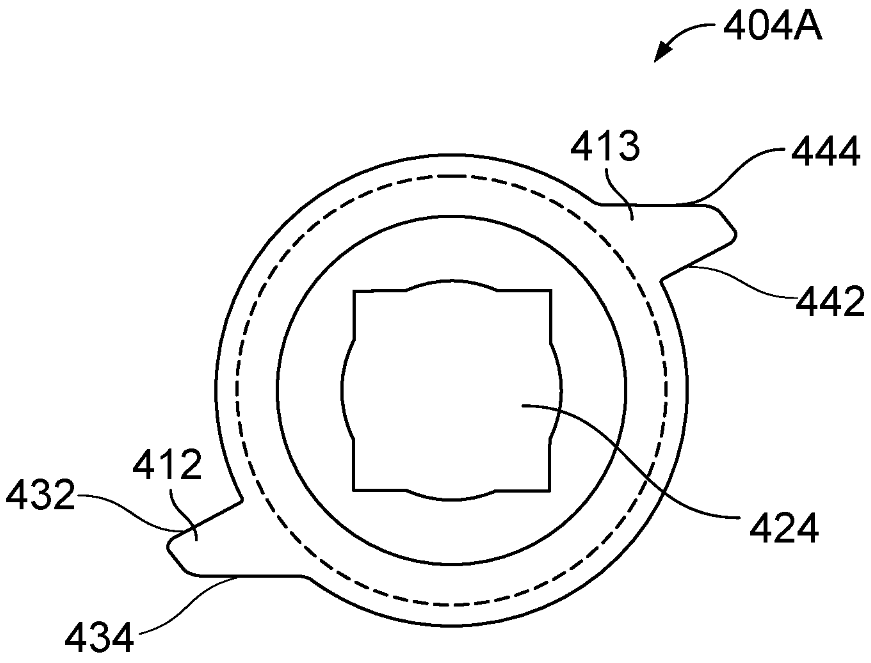
FIG. 4A illustrates a front view of a lefthanded doorknob actuator according to an embodiment.
Figure 4B:
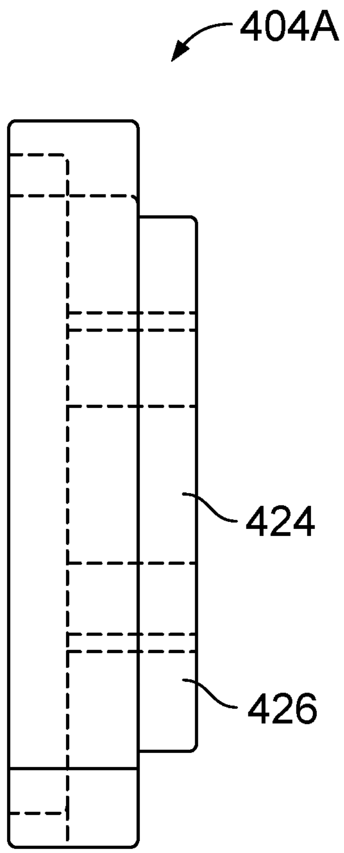
FIG. 4B illustrates a side view of the lefthanded doorknob actuator of FIG. 4A.
Figure 4C:
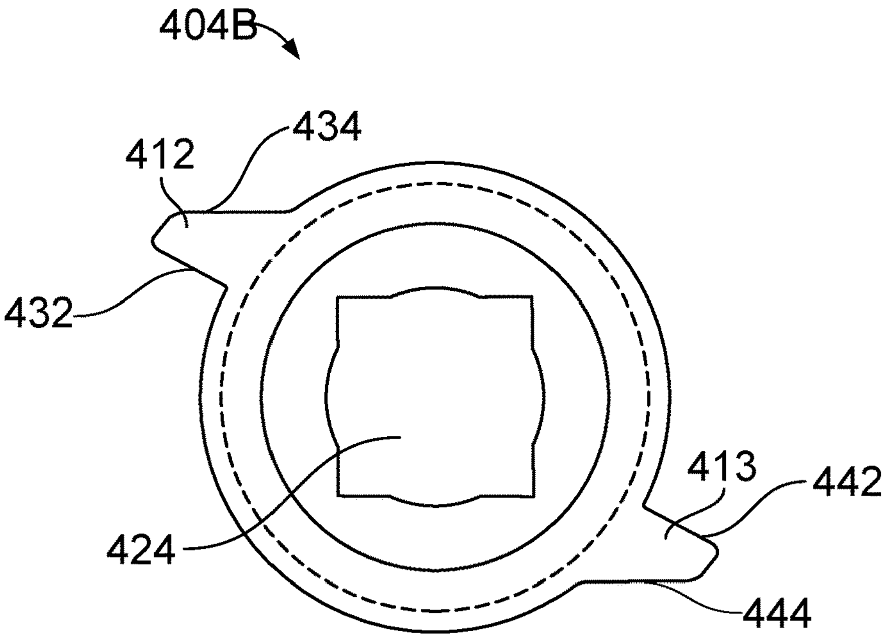
FIG. 4C illustrates a front view of a righthanded doorknob actuator according to an embodiment.
Figure 4D:
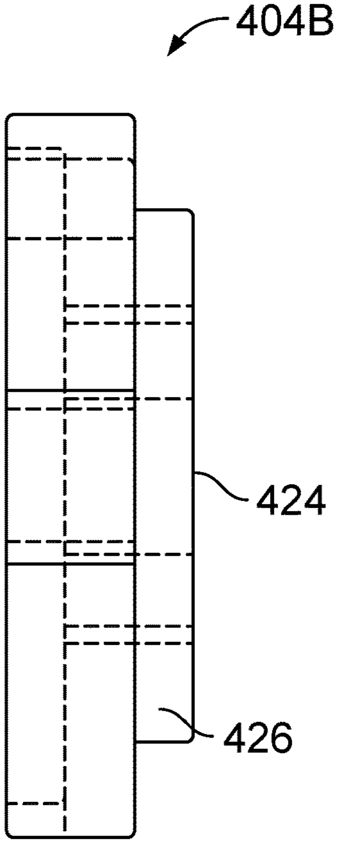
FIG. 4D illustrates a side view of the righthanded doorknob actuator of FIG. 4C.
Figure 4E:
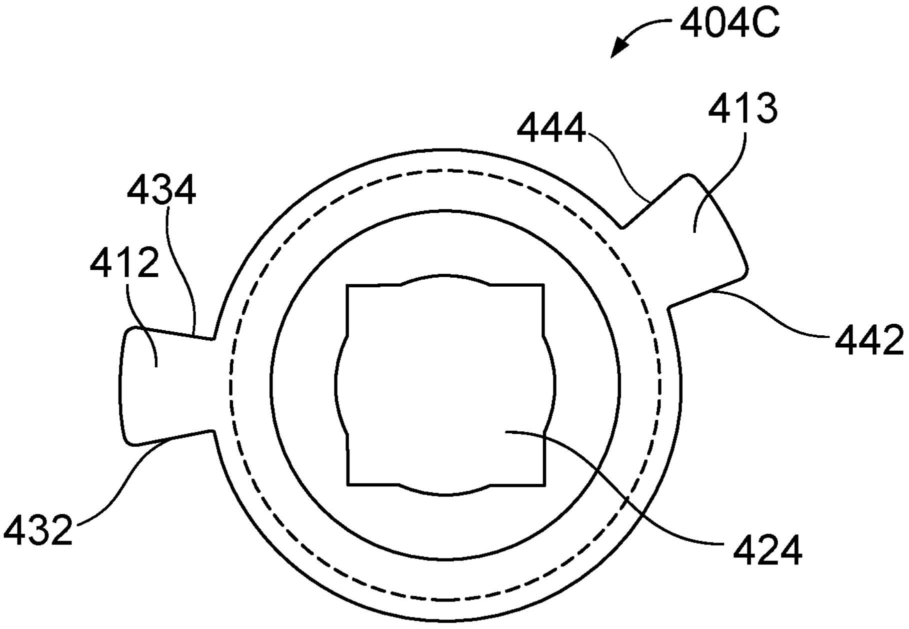
FIG. 4E illustrates a front view of a bidirectional doorknob actuator according to an embodiment.
Figure 4F:
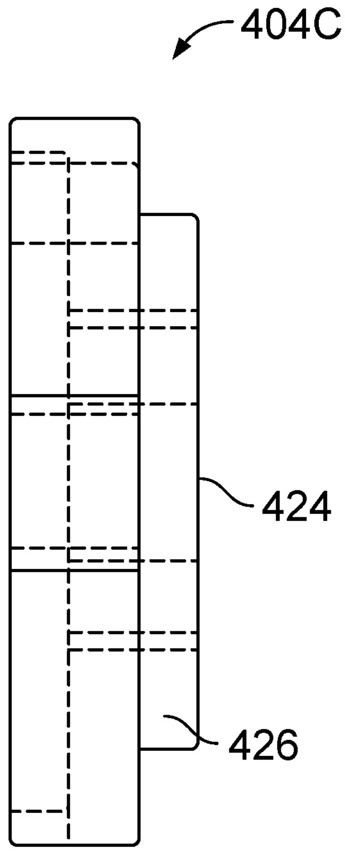
FIG. 4F illustrates a side view of the bidirectional doorknob actuator of FIG. 4E.

FIGS. 4A-4F illustrates detailed views of a rotational actuator 404A, 404B, 404C. Specifically, FIGS. 4A and 4C illustrate the rotational actuator 404A, 404B suitable for unidirectional applications, and FIG. 4E illustrates the rotational actuator 404C suitable for bidirectional applications.

The rotational actuators 404A, 404B, 404C may each include a first actuator tab 412 and a second actuator tab 413. The first actuator tab 412 may include a first side 432 and a second side 434 opposite the first side. Similarly, the second actuator tab 413 may include a first side 442 and a second side 444 opposite the first side. The first side 432, 442 may each be a leading edge designed to abut against a spring and the second side 434, 444 may each be a trailing edge designed to abut against a housing.

As can be appreciated, the rotational actuator 404A of FIG. 4A may be especially suitable for unilateral righthanded applications, the rotational actuator 404B of FIG. 4C may be especially suitable for unilateral lefthanded applications, and the rotational actuator 404C of FIG. 4E may be especially suitable for bidirectional applications.

In some embodiments, the rotational actuator 404A, 404B, 404C may each include a broach 424, which may be circular, partially circular, or other suitable shapes. The broach 424 may be hollowed out of a center of a boss 426 from a front surface of the rotational actuator 404A, 404B, 404C. The boss 426 may be circular or other suitable shapes. The boss 426 may be centrally located on the rotational actuator 404A, 404B, 404C in such a way that the boss 426 is designed to nest within a cavity of a housing (such as the cavity 240 in FIGS. 2B and 2D). The boss 426 may extend from the front surface of the rotational actuator 404A, 404B, 404C and fits into a hole drilled in the center of the housing to keep the rotational actuator 404A, 404B, 404C concentric within the housing.

A counterbore may be machined into a back surface of the rotational actuator 404A, 404B, 404C, creating a cavity for an opposing boss on a back surface of a plurality of mounting plates to fit into. The stacking of rotational actuator, housing, and mounting plate holes, counterbores, and bosses in the system may provide the rotational actuator 404A, 404B, 404C additional axial support to maintain concentricity and prevent the rotational actuator 404A, 404B, 404C from binding within the housing.

In some embodiments, the rotational actuator 404A, 404B, 404C may be mostly circular in shape with actuator tabs 412, 413 jutting out from the sides of the rotational actuator 404A, 404B, 404C. The rotational actuator 404A, 404B, 404C may have an outer diameter of about 0.076 inches with a tolerance of about +0.003 inches and −0.002 inches, though other diameters and tolerances are envisioned. The inner diameter of the broach 424 of the rotational actuator 404A, 404B, 404C may be about 0.358 inches with a broach of about 0.319 inches, though other diameters are envisioned. The rotational actuator 404A, 404B, 404C may have a total thickness dimension of about 0.195 inches where the boss 426 makes up a portion of that thickness dimension having a thickness dimension of about 0.06 inches. The boss 426 may have a diameter of about 0.56 inches with a tolerance of +0.003 inches and −0.002 inches, though other diameters and tolerances are envisioned.

In some unidirectional embodiments, the first actuator tab 412 may be placed at an angle of about 118 degrees, while the second actuator tab 413 may be placed at an angle of about 298 degrees. In other unidirectional embodiments, the first actuator tab 412 may be placed at an angle of about 62 degrees, while the second actuator tab 413 may be placed at an angle of about 242 degrees.

In some bidirectional embodiments, the first actuator tab 412 may be placed at about 150 degrees at the central line of the first actuator tab 412, while the second actuator tab 413 may be placed at an angle of about 0 degrees at the central line of the second actuator tab 413. As can be appreciated, these embodiments are merely exemplary and are not meant to be limiting.

Figure 5A:
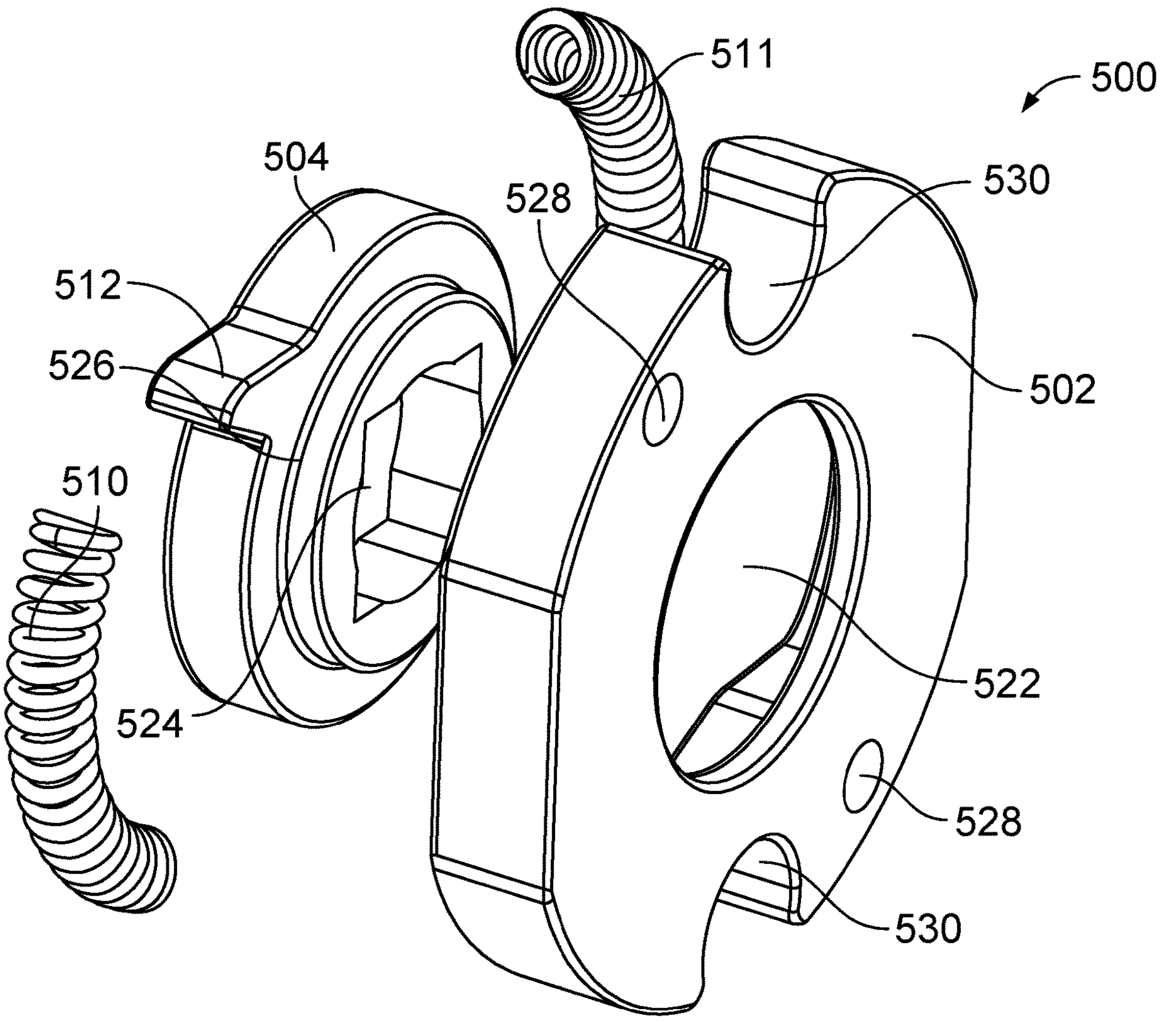
FIG. 5A illustrates an exploded iso back view of a unidirectional doorknob system according to an embodiment.
Figure 5B:
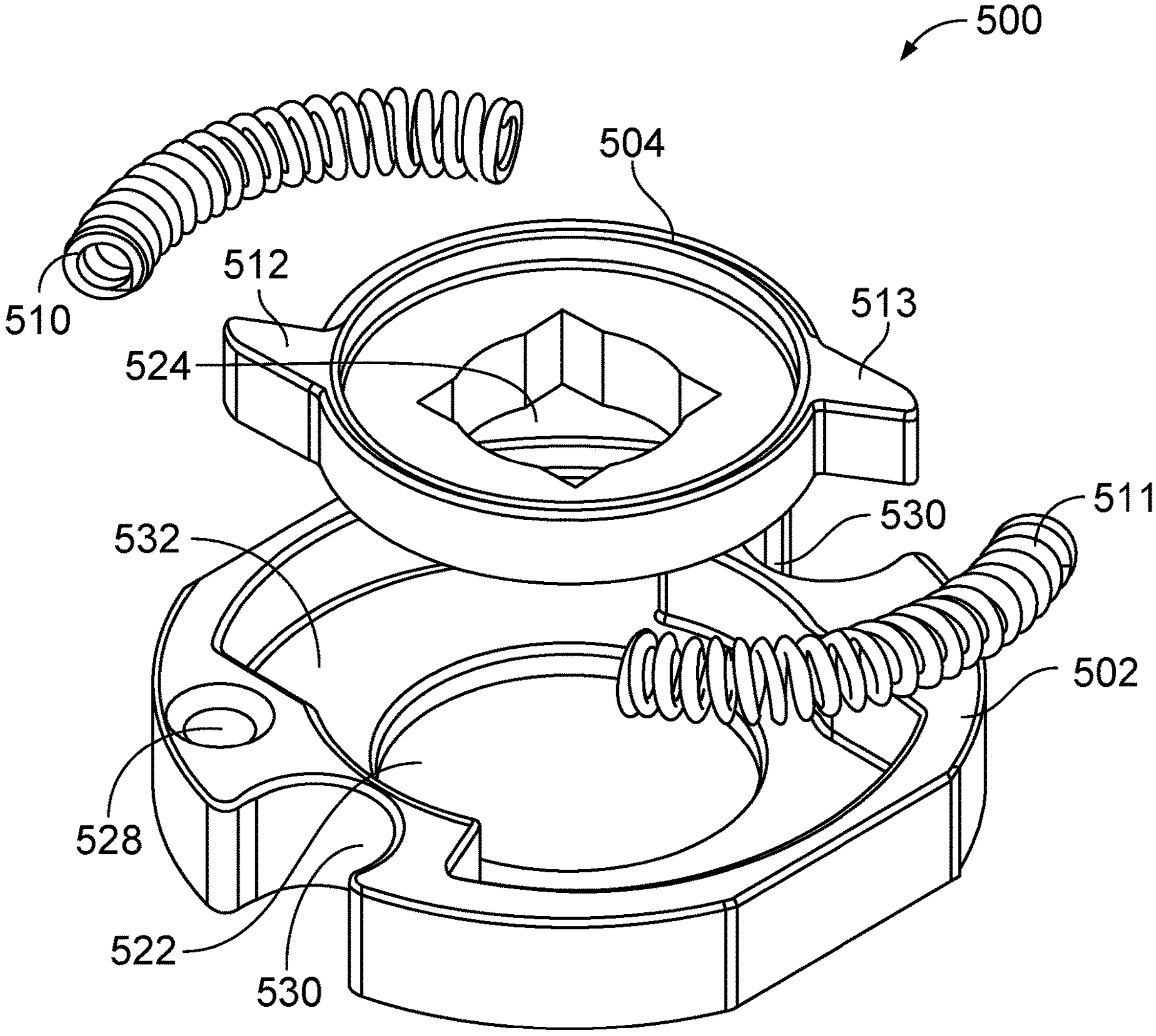
FIG. 5B illustrates an exploded iso top view of the unidirectional doorknob system of FIG. 5A.
Figure 5C:
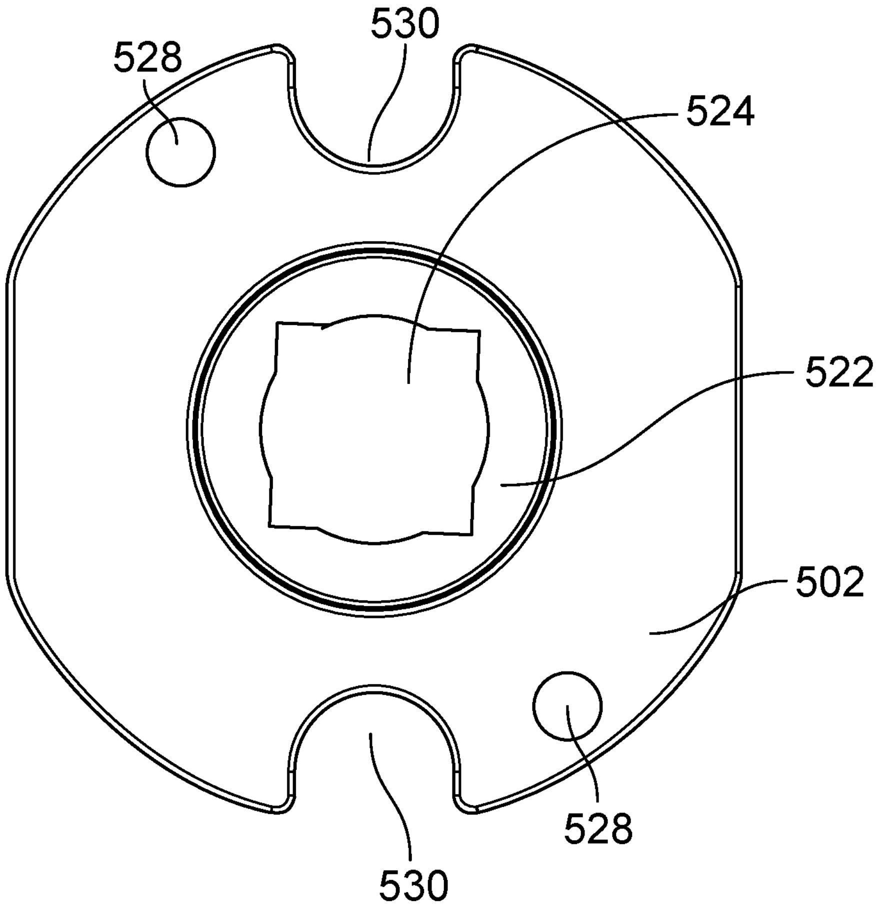
FIG. 5C illustrates a bottom view of the unidirectional doorknob system of FIG. 5A.

FIGS. 5A-5C illustrate an embodiment of a unidirectional doorknob system 500. In this embodiment, the system 500 may include a housing 502, a rotational actuator 504, and springs 510, 511.

The housing 502 may include a housing hole 522 that may be circular shaped. The housing 502 may further include one or more threaded holes 528 and one or more notches 530 (which may be "C" shaped) on the opposing ends of the housing 502 such as the top end and the bottom end, which may be used for attaching the system 500 to different mounting plates based on the specific application. The housing 502 may include flat edges on the exterior of two sides for clearance of other components. The notches 530 on the housing 502 may be designed for the clearance of mounting studs.

The rotational actuator 504 may include a first actuator tab 512 and a second actuator tab 513, a counterbore 524, and a boss 526 on a front surface of the actuator 504. The boss 526 may to be inserted into the housing bore 522 to keep the actuator 504 concentric with the housing 502.

The actuator 504 may also include a counterbore on the back surface, creating a cavity to receive an opposing boss on the backside of a plurality of mounting plates. The springs 510, 511 may be encased within the housing 502 on opposite sides of the actuator 504 and work together in the same direction of rotation to create a balanced, stable mechanical system. In bidirectional embodiments, springs would work against each other creating opposing forces to keep the actuator in a neutral resting position.

The system 500 may be used in at least three different applications including 1⅜" bore sectional door hardware, 2⅛" bore sectional door hardware, and escutcheon door hardware of either bore depending on the width of the escutcheon plate. Of course, the system 500 may be suitable for additional applications and are within the scope of this disclosure.

Figure 6A:
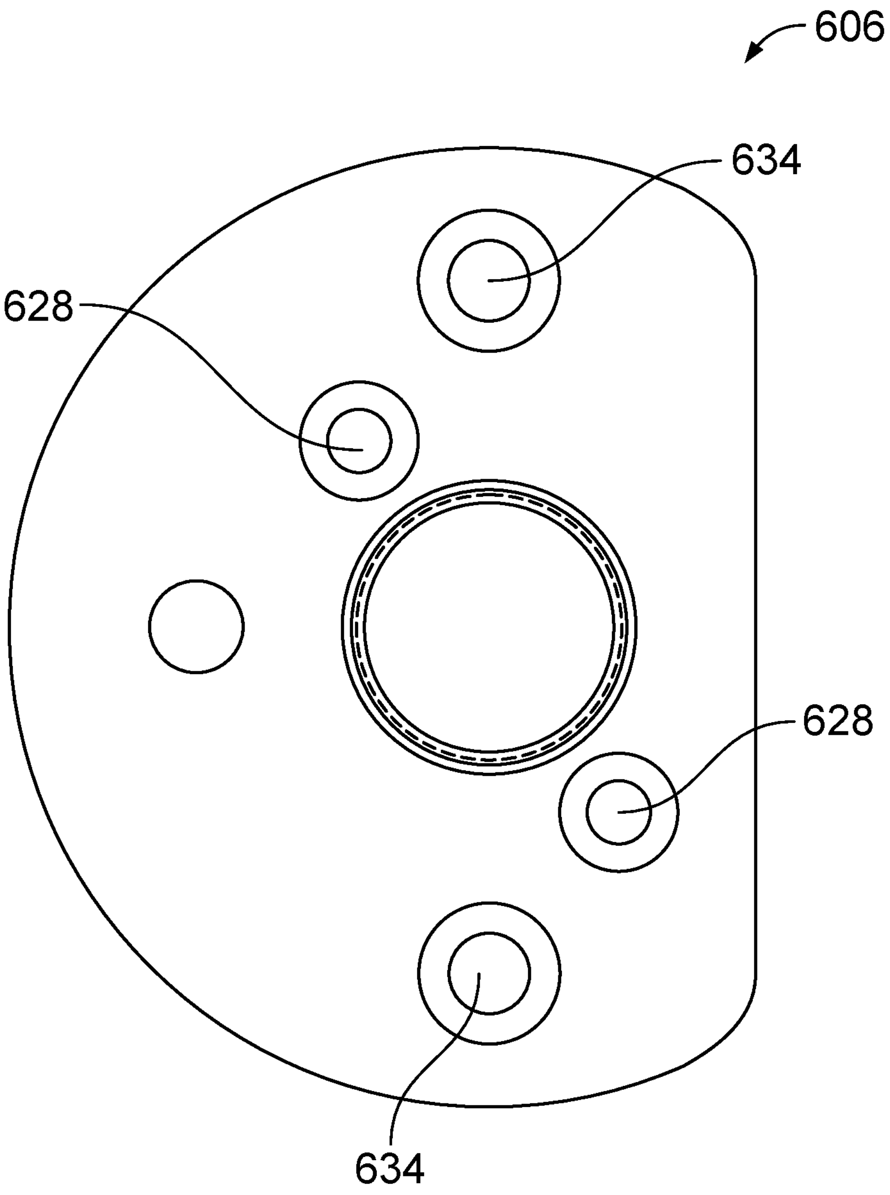
FIG. 6A illustrates a front view of a lefthanded doorknob mounting plate according to an embodiment.
Figure 6B:
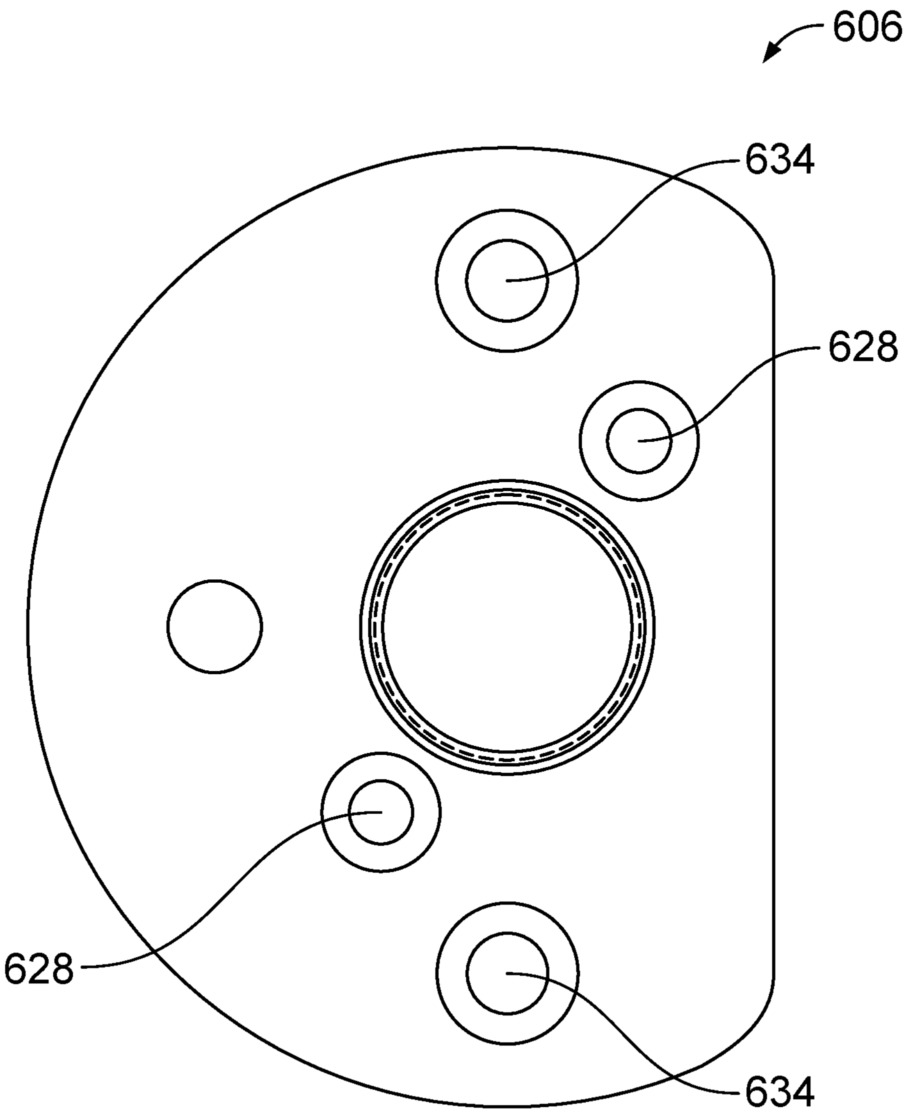
FIG. 6B illustrates a front view of a righthanded doorknob mounting plate according to an embodiment.
Figure 6C:
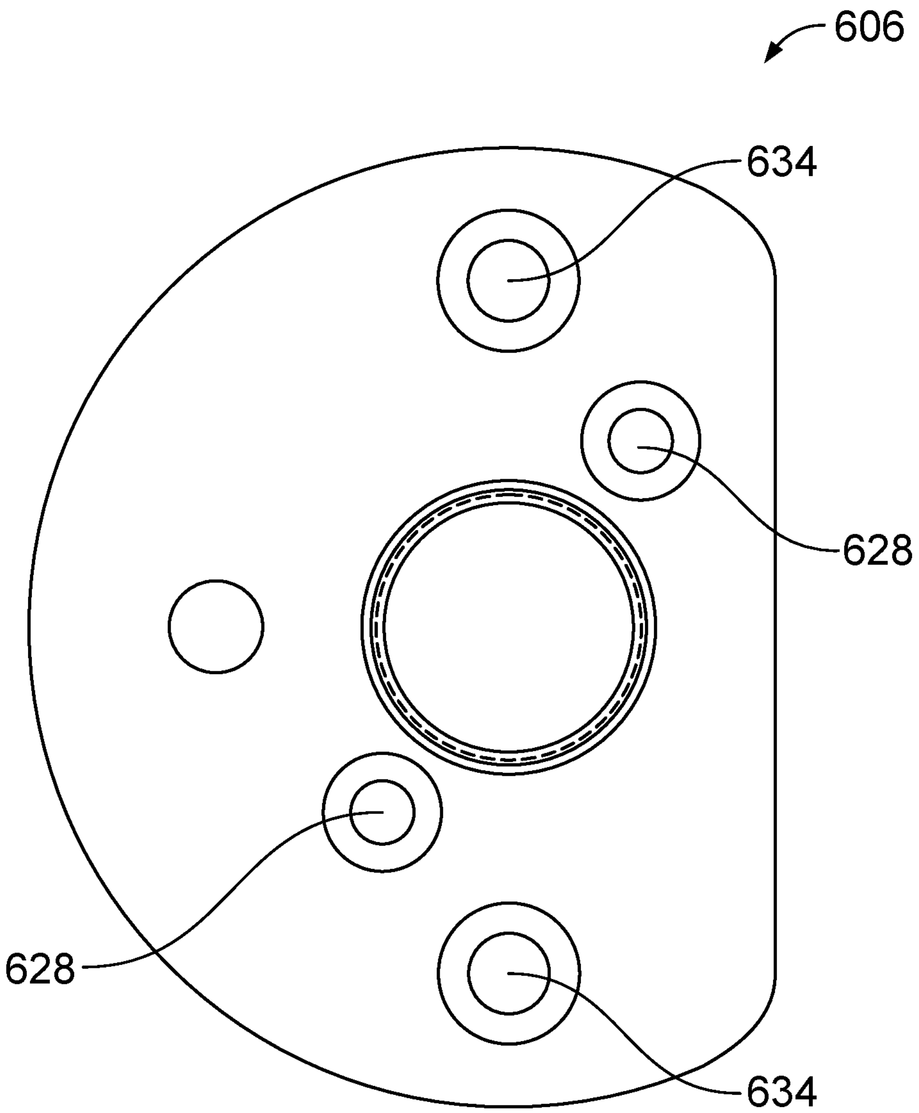
FIG. 6C illustrates a front view of a bidirectional doorknob mounting plate according to an embodiment.

FIGS. 6A-6C illustrate various embodiments of a mounting plate 606. The mounting plate 606 may include holes 628 for receiving fasteners therethrough for securing the mounting plate 606 to a housing. The holes 628 may each be adjacent to a stud hole 634 for receiving fasteners to secure the mounting plate to the system via the mounting studs where the fasteners that are inserted through the holes 634 are received by the mounting studs.

FIG. 6A illustrates an embodiment of a lefthanded unidirectional mounting plate 606 configuration with a lever-style handle of a system, while FIG. 6B illustrates an embodiment of a righthanded unidirectional mounting plate 606 configuration with a lever-style handle of a system, and FIG. 6C illustrates an embodiment of a bidirectional mounting plate 606 configuration for a knob-style door system.

Specific embodiments of a doorknob system according to this disclosure have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. A door hardware mounting system comprising:

a first housing for receiving a knob or a lever of a door; the first housing having a first cavity therein;

a first rotational actuator provided within the first cavity, the first rotational actuator having a first actuator tab and a second actuator tab, wherein each of the first actuator tab and the second actuator tab comprises a first edge and a second edge, wherein the first edge of the first actuator tab and the second actuator tab forms a perpendicular angle with the first housing, and wherein the second edge of the first actuator tab and the second actuator tab forms an obtuse angle with the first housing; and a first spring and a second spring provided within the first cavity, wherein the first actuator tab abuts the first spring and the second actuator tab abuts the second spring.

2. The door hardware mounting system of claim 1, wherein the first actuator tab is provided on a first side of the first rotational actuator and the second actuator tab is provided on a second side of the first rotational actuator opposite the first side.

3. The door hardware mounting system of claim 1, wherein the first actuator tab abuts the first spring from a first direction and the second actuator tab abuts the second spring from a second direction.

4. The door hardware mounting system of claim 3, wherein the first actuator tab abuts the first spring and the second actuator tab abuts the second spring, such that the first spring and the second spring jointly provide resistance force against the first rotational actuator when the first rotational actuator is rotated in a counterclockwise direction by an external force.

5. The door hardware mounting system of claim 3, wherein the first actuator tab abuts the first spring and the second actuator tab abuts the second spring, such that the first spring and the second spring jointly provide resistance force against the first rotational actuator when the first rotational actuator is rotated in a clockwise direction by an external force.

6. The door hardware mounting system of claim 1, wherein the first actuator tab abuts the first spring and the second actuator tab abuts the second spring from a same direction, such that the first spring or the second spring provides resistance force against the first rotational actuator when the first rotational actuator is rotated in either a clockwise direction or a counterclockwise direction by an external force.

7. The door hardware mounting system of claim 6, wherein the first actuator tab abuts the first spring and the second actuator tab also abuts the second spring.

8. The door hardware mounting system of claim 1, wherein a first end of the first spring abuts the first actuator tab and a second end of the first spring abuts the first housing, and a first end of the second spring abuts the second actuator tab and a second end of the second spring abuts the first housing.

9. The door hardware mounting system of claim 1, wherein the first actuator tab having a first side and a second side opposite the first side, and the second actuator tab having a first side and a second side opposite the first side, wherein the first side of the first actuator tab abuts the first spring and the first side of the second actuator tab abuts the second spring, and while the first rotational actuator is in a neutral position, the second side of the first actuator tab abuts the first housing and the second side of the second actuator tab also abuts the first housing.

10. The door hardware mounting system of claim 1, wherein the first housing further comprising a notch for receiving a stud or a fastener therein.

11. The door hardware mounting system of claim 1, wherein the first housing further comprising a fastening bore for receiving a fastener therein.

12. The door hardware mounting system of claim 1, wherein the first spring and the second spring are provided on different sides of the first housing.

13. The door hardware mounting system of claim 1 further comprising a first mounting plate coupled to the first housing such that the first rotational actuator, the first spring, and the second spring are encased between the first mounting plate and the first housing.

14. The door hardware mounting system of claim 13 further comprising:

a second housing attachable to the knob or the lever; the second housing having a second cavity therein;

a second rotational actuator provided within the second cavity, the second rotational actuator having a third actuator tab and a fourth actuator tab;

a third spring and a fourth spring provided within the second cavity, wherein the third actuator tab abuts the third spring and the fourth actuator tab abuts the fourth spring; and a second mounting plate coupled to the second housing such that the second rotational actuator, the third spring, and the fourth spring are encased between the second mounting plate and the second housing.

15. The door hardware mounting system of claim 14 further comprising a latch stabilizer provided between the first housing and the second housing.

16. The door hardware mounting system of claim 1, wherein the first rotational actuator further comprising a boss protruding from a first surface of the first rotational actuator such that the boss, wherein the first housing further comprising a housing bore for receiving the boss, and wherein the boss together with the housing bore are configured to keep the first rotational actuator concentric with the first housing.

17. A door hardware mounting system comprising:

a first housing attachable to a knob or a lever, the first housing having a first cavity therein;

a first rotational actuator provided within the first cavity, the first rotational actuator having a first actuator tab and a second actuator tab, wherein each of the first actuator tab and the second actuator tab comprises a first edge and a second edge, wherein the first edge of the first actuator tab and the second actuator tab forms a perpendicular angle with the first housing, and wherein the second edge of the first actuator tab and the second actuator tab forms an obtuse angle with the first housing;

a first spring and a second spring provided within the first cavity, wherein the first actuator tab abuts the first spring and the second actuator tab abuts the second spring;

a first mounting plate coupled to the first housing such that the first rotational actuator, the first spring, and the second spring are encased between the first mounting plate and the first housing;

a second housing attachable to the knob or the lever; the second housing having a second cavity therein;

a second rotational actuator provided within the second cavity, the second rotational actuator having a third actuator tab and a fourth actuator tab, wherein each of the third actuator tab and the fourth actuator tab comprises a first edge and a second edge, wherein the first edge of the third actuator tab and the fourth actuator tab forms a perpendicular angle with the second housing, and wherein the second edge of the third actuator tab and the fourth actuator tab forms an obtuse angle with the second housing;

a third spring and a fourth spring provided within the second cavity, wherein the third actuator tab abuts the third spring and the fourth actuator tab abuts the fourth spring;

a second mounting plate coupled to the second housing such that the second rotational actuator, the third spring, and the fourth spring are encased between the second mounting plate and the second housing; and a latch stabilizer provided between the first housing and the second housing.

18. The door hardware mounting system of claim 17, wherein the first actuator tab abuts the first spring and the third actuator tab abuts the third spring respectively, and the second actuator tab abuts the second spring and the fourth actuator tab abuts the fourth spring respectively, such that the first spring, the second spring, the third spring, and the fourth spring jointly provide resistance force against the first rotational actuator and the second rotational actuator respectively when the first rotational actuator and the second rotational actuator are rotated in a counterclockwise direction by an external force.

19. The door hardware mounting system of claim 17, wherein the first actuator tab abuts the first spring and the third actuator tab abuts the third spring respectively, and the second actuator tab abuts the second spring and the fourth actuator tab abuts the fourth spring respectively, such that the first spring, the second spring, the third spring, and the fourth spring jointly provide resistance force against the first rotational actuator and the second rotational actuator respectively when the first rotational actuator and the second rotational actuator are rotated in a clockwise direction by an external force.

20. The door hardware mounting system of claim 17, wherein the first actuator tab abuts the first spring, the second actuator tab abuts the second spring, the third actuator tab abuts the third spring, and the fourth actuator tab abuts the fourth spring each from a same direction, such that the first spring with the third spring or the second spring with the fourth spring provide resistance force against the first rotational actuator and the second rotational actuator respectively when the first rotational actuator and the second rotational actuator are rotated in either a clockwise direction or a counterclockwise direction by an external force.

21. A door hardware mounting system comprising:

a first housing attachable to a knob or a lever; the first housing having a first cavity therein;

a first rotational actuator provided within the first cavity;

a first spring and a second spring provided within the first cavity; and a first actuator tab and a second actuator tab, wherein each of the first actuator tab and the second actuator tab comprises a first edge and a second edge, wherein the first edge of the first actuator tab and the second actuator tab forms a perpendicular angle with the first housing, and wherein the second edge of the first actuator tab and the second actuator tab forms an obtuse angle with the first housing.

* * * * *